United States Patent
Norlén et al.

(10) Patent No.: US 10,251,094 B2
(45) Date of Patent: Apr. 2, 2019

(54) METHOD AND SYSTEM FOR SELECTING COMMUNICATION PARAMETERS IN A WIRELESS NETWORK

(71) Applicant: LumenRadio AB, Göteborg (SE)

(72) Inventors: Niclas Norlén, Uddevalla (SE); Michael Karlsson, Kode (SE); Lars Fabian Paape, London (GB); Marcus Bengtsson, Flushing, NY (US)

(73) Assignee: LumenRadio AB, Göteborg (SE)

( * ) Notice: Subject to any disclaimer, the term of this patent is extended or adjusted under 35 U.S.C. 154(b) by 0 days.

(21) Appl. No.: 15/547,190

(22) PCT Filed: Feb. 3, 2016

(86) PCT No.: PCT/SE2016/050081
§ 371 (c)(1),
(2) Date: Jul. 28, 2017

(87) PCT Pub. No.: WO2016/126195
PCT Pub. Date: Aug. 11, 2016

(65) Prior Publication Data
US 2018/0279179 A1     Sep. 27, 2018

(30) Foreign Application Priority Data

Feb. 4, 2015  (SE) ........................ 1550116

(51) Int. Cl.
*H04W 28/18*     (2009.01)
*H04L 1/00*      (2006.01)
(Continued)

(52) U.S. Cl.
CPC ............ *H04W 28/18* (2013.01); *H04B 1/713* (2013.01); *H04L 1/0026* (2013.01);
(Continued)

(58) Field of Classification Search
CPC .... H04W 28/18; H04W 84/20; H04L 1/0026; H04B 1/713
See application file for complete search history.

(56) References Cited

U.S. PATENT DOCUMENTS

| | | |
|---|---|---|
| 2008/0227461 A1 | 9/2008 | Dayal et al. |
| 2009/0191882 A1 | 7/2009 | Kovacs et al. |

(Continued)

FOREIGN PATENT DOCUMENTS

| | | |
|---|---|---|
| EP | 2096890 A1 | 9/2009 |
| EP | 2296407 A1 | 3/2011 |

(Continued)

OTHER PUBLICATIONS

Shen Yu-Long et al., "An Access Control Scheme in Wireless Sensor Networks", 2007 IFIP International Conference on Network and Parallel Computing Workshops (NPC 2007), Liaoning, 2007, pp. 362-367.

*Primary Examiner* — Bo Hui A Zhu
(74) *Attorney, Agent, or Firm* — Capitol City TechLaw

(57) ABSTRACT

The present invention relates to a method and system for selecting communication parameters in a wireless network comprising a plurality of nodes configured to wirelessly communicate with each other over a plurality of communication channels The method comprises: establishing 43 a channel quality index for each node in the wireless network, arranging 42 the plurality of nodes into one master node configured to select communication parameters in the network and at least one sub-node, configuring the wireless network in a tree structure, calculating 44 in each node a modified channel quality index based on the channel quality index established in the node, and an accumulated channel quality index based on the channel quality index established in the child nodes, transmitting 46 the modified channel quality index to the parent node, and selecting and commu- (Continued)

nicating 49 updated communication parameters based on the modified channel quality index calculated in the master node.

15 Claims, 4 Drawing Sheets

(51) Int. Cl.
 *H04B 1/713* (2011.01)
 *H04L 12/24* (2006.01)
 *H04W 84/20* (2009.01)
(52) U.S. Cl.
 CPC ............ *H04L 1/0029* (2013.01); *H04L 41/30* (2013.01); *H04W 84/20* (2013.01)

(56) References Cited

U.S. PATENT DOCUMENTS

2010/0215378 A1   8/2010   Rajagopal et al.
2011/0305190 A1   12/2011  Seki

FOREIGN PATENT DOCUMENTS

| WO | 2008056023 | A1 | 5/2008 |
| WO | 2008056023 | A1 | 6/2008 |
| WO | 2009143287 | A1 | 11/2009 |

…

METHOD AND SYSTEM FOR SELECTING COMMUNICATION PARAMETERS IN A WIRELESS NETWORK

This application claims priority under 35 USC 119(a)-(d) to SE patent application No. 1550116-6 filed Feb. 4, 2015, the entire content of which is incorporated herein by reference.

TECHNICAL FIELD

The present invention relates to a method for selecting communication parameters in a wireless network as defined in the preamble of the independent claim 1. The invention also relates to a system for selecting communication parameters in a wireless network.

BACKGROUND

When communicating in a wireless network, it is essential to be able to transmit and receive data packets between nodes in an effective way. By monitoring the wireless environment and detecting suitable communication channels for each node, it is possible to establish a set of communication parameters that can be used to communicate within the wireless network.

Typically, a special designed node is selected to be master since the master is configured to collect information regarding the wireless environment for each node and is also configured to process the collected information and make a decision regarding suitable communication parameters to be used in the wireless network.

Thus, the master node differs from the other nodes in the wireless network since it requires a larger memory for storing the collected information and a more complex processor to process the collected information.

US 2010/0215378 A1 by Rajagopal et al. discloses an ad-hoc network with nodes (one master and one or more slaves) used in a method for channel selection in a VLC network (Visible Light Communication network). A quality indication for each available communication channel is established for each node and used by the master to perform channel selection.

EP 2296407 A1 by Qiang et al. discloses a wireless network comprising nodes divided into a central node (PAN coordinator) and a number of sub-nodes (coordinator/common node) arranged in a tree structure. A global routing table is created (either directly or distributed) by the central node based on information from all sub-nodes.

SUMMARY

One object with the present invention is to provide an improved method for selecting and distributing communication parameters in a wireless network compared to prior art.

The object may be achieved with a method for selecting communication parameters in a wireless network comprising a plurality of nodes configured to wirelessly communicate with each other over a plurality of communication channels. The method comprises a number of steps:

a) establishing a channel quality index for each node $CQI_{node}$ in the wireless network, wherein the channel quality index comprising a quality indication value for each of said communication channels, b) dividing the plurality of nodes into one master node and at least one sub-node. The master node is configured to select communication parameters in the network, and to communicate the communication parameters to the at least one sub-node in the wireless network, c) configuring the wireless network in a tree structure whereby each sub-node has a parent node and each node may have one or more child nodes, d) for each node, calculating a modified channel quality index $CQI'_{node}$ based on
   the channel quality index established in the node $CQI_{node}$, and
   an accumulated channel quality index $CQI_{acc}$ based on the channel quality index established in the child node(s), if any, e) for each sub-node, configuring the sub-node to transmit the modified channel quality index $CQI'_{node}$ to the parent node, and f) selecting and communicating updated communication parameters based on the modified channel quality index calculated in the master node.

An advantage with the present invention is that any node in the wireless network can be selected as master node since the same calculations are performed in each node based upon the information obtained in child nodes, if any, and the information obtained in the node.

Another advantage is that the number of data packets with information regarding the wireless environment is reduced since the result from the calculations in each sub-node is communicated to the parent node, which uses the communicated result as input when calculating information regarding the wireless profile in the parent node before transmitting it further up in the tree structure.

Further objects and advantages will be apparent for a skilled person from the detailed description and the drawings.

DETAILED DESCRIPTION

The invention described below is a general method for collecting information regarding the wireless environment for each node in a wireless network, selecting communication parameters based upon the collected information in a predetermined node (often called master node), and thereafter distributing communication parameters to the other nodes (often called sub-nodes) in the wireless network.

For illustration purposes the communication parameters is selected to be frequency channels (f1; f2; ... fn), e.g. used in frequency hopping network. It should be noted that the communication parameters should not be limited to frequency channels, and other types of communication parameters may be used which is obvious for a skilled person in the art. Examples of other types of communication parameters are modulation form and on-air data rate.

Figure 1:
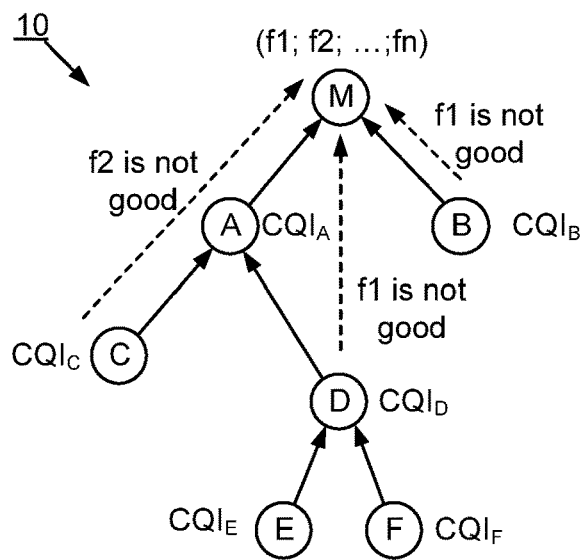
FIG. 1 illustrates a procedure for collecting communication parameters in a wireless network according to the prior art.

FIG. 1 illustrates a procedure 10 for collecting communication parameters in a wireless network according to the prior art. In this example, the wireless network comprises seven nodes, six sub-nodes A-F and a master node M. The sub-nodes and master node are configured to monitor their respective wireless environment, i.e. to identify good and bad communication parameters within their range and generate a channel quality index for each node "$CQI_{node}$". Other wireless networks might affect nodes within the wireless network and this information is essential for the master node in order to make a decision regarding which communication parameters to use.

The nodes of the wireless network in FIG. 1 are arranged in a tree structure with the master node M at the top level. Each sub-node A-F has a parent node and each node may have one or more child nodes. E.g. sub-node "A" has a parent node "M" and two child nodes "C" and "D". However, sub-node "E" has a parent node "D" and no child nodes. Each sub-node knows which node is their parent node, but normally does not have any knowledge of which sub-nodes are child nodes. This arrangement provides a one-way communication link from the sub-nodes to the master node, as indicated by the solid arrows between the nodes in the tree structure 10.

The master node M will collect the CQI from each sub-node A-F, as indicated by dashed arrows. For example, node "C" monitors the wireless environment and establishes a channel quality index $CQI_C$, indicating that frequency channel f2 is not good. The information is thereafter transmitted to the master node "M", via sub-node "A". The same procedure is performed by all sub-nodes and the information is transmitted to the master node.

Below is an example of how the prior art collection procedure might work. In this example the communication channels are selected to be four, i.e. f1; f2; f3 and f4. Each frequency channel is monitored and is assigned a quality indication value, which in this example is a discrete value, indicating if the channel is good "0" or bad "1" for communication purposes. The CQI for each node can be expressed as (f1; f2; f3; f4).

In table 1, CQI for each node is illustrated. The master node "M" has access to the CQI for all nodes and uses them to determine how to use the available communication channels within the network.

TABLE 1

| Node | CQI |
|------|-----|
| A | (0; 0; 0; 0) |
| B | (1; 0; 0; 0) |
| C | (0; 1; 0; 0) |
| D | (1; 0; 0; 0) |
| E | (0; 0; 0; 0) |
| F | (0; 0; 0; 0) |
| M | (0; 0; 0; 0) |

The master node M may be summing the CQI for all nodes to obtain knowledge of any interfering networks. In this example the sum of all quality indication values for each communication channel f1-f4 will be:

$$\Sigma_{A-M}CQI_{node}=(2;1;0;0) \quad (1)$$

The master node will thereafter make a decision regarding which communication parameters to use based on the result from equation (1). A set of rules will decide this, e.g. select to use only communication channels with a summed quality indication value being maximum "1"=>use f2; f3 and f4.

A drawback with the prior art procedure is that the master node has to have a sufficiently large memory to store CQI from each node and also have to be able to process the information to provide a result upon which the master node can decide the communication parameters. The sub-nodes only have a limited ability to store data and to process data internally. This normally means that the master node is a special unit since it is rather expensive to manufacture.

Figure 2:
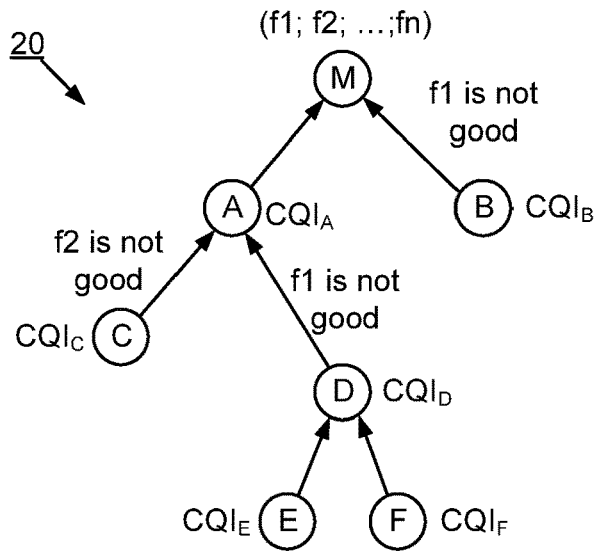
FIG. 2 illustrates a first embodiment of a procedure for collecting and selecting communication parameters in a wireless network.

FIG. 2 illustrates a first embodiment 20 of a procedure for collecting and selecting communication parameters in a wireless network. Each node establishes a channel quality index CQI, as described in connection with FIG. 1, but instead of transmitting the information from each sub-node to the master node, a modified channel quality index $CQI'_{node}$ is calculated in each node (sub-nodes and master node) based on:

the channel quality index $CQI_{node}$ established in the node, and an accumulated channel quality index $CQI_{acc}$ based on the channel quality index established in the child node(s), if any.

The equations (2) and (3) below illustrate two alternatives to calculate the modified channel quality index in each node. The sub-nodes thereafter transmits the modified channel quality index to its parent node, and the master node uses the calculated modified channel quality index to make a decision how to use the available communication resources most efficiently by selecting appropriate communication parameters.

Equation (2) illustrates a first alternative to calculate the modified channel quality index. The quality indication value of the channel quality index established by the node, and the quality indication value of the accumulated channel quality index may be summed for each communication channel to create said modified channel quality index.

$$CQI'_{node}=CQI_{acc}CQI_{node} \quad (2)$$

Equation (3) illustrates a second alternative to calculate the modified channel quality index. The quality indication value for each communication channel of the channel quality index established by the node may be weighted by a factor (n+1), and the weighted quality indication value and the quality indication value of the accumulated channel quality index may be summed for each communication channel to create said modified channel quality index.

$$CQI'_{node}=CQI_{acc}+(n+1)\cdot CQI_{node} \quad (3)$$

n may be an index value corresponding to the number of sub-nodes that have contributed to the accumulated channel quality index. In order to keep track of the number of sub-nodes that have contributed to the accumulated channel quality index, each child node may transmit a child index value $n'_{child\ node}$ indicating the number of sub-nodes that have contributed to the modified channel quality index from each child node. The node is configured to calculate the index value n $$n = \Sigma n'_{child\ node} \quad (4a)$$

$$n'_{node} = n+1 \quad (4b)$$

Each node calculates a modified index value $n'_{node}$, which may be equal to the factor mentioned above (i.e. index value plus one, n+1), used to calculate the weighted quality indication value. The modified index value is thereafter transmitted to its parent node.

The accumulated channel quality index $CQI_{acc}$ is based on the modified channel quality index transmitted from the one or more child nodes, if any.

The accumulated channels quality index $CQI_{acc}$ may comprise summing, for each communication channel, the quality indication value of the modified quality index transmitted from the child node(s), if any, as shown in equation (5).

$$CQI_{acc} = \Sigma CQI'_{child\ node} \quad (5)$$

When the modified channel quality index has been calculated, each sub-node (A-F) is configured to transmit the modified channel quality index to the parent node for further calculations in the parent node. If the parent node is the master node, the updated communication parameters are selected based on the modified channel quality index calculated in the master node and the updated communication parameters are communicated to the sub-nodes for future use.

Figure 3:
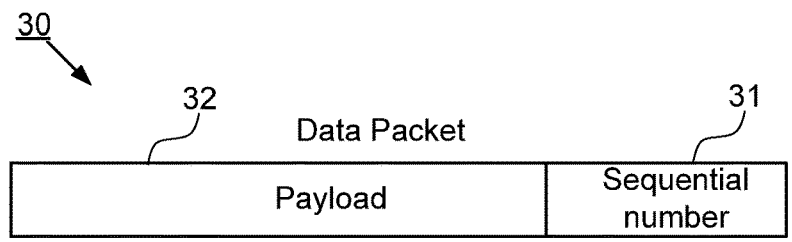
FIG. 3 shows a data packet configured to be used for communication within a wireless network.

FIG. 3 shows a data packet 30 configured to be used for communication within a wireless network. The data packet can have an arbitrary length, usually defined by the network protocol, and comprises at least two portions. A first portion is a number field 31 and a second portion is a payload field 32. The payload field 32 contains data to be communicated within the network and the number field contains a sequential number that indicates if there has been a change in communication parameters within the network.

The sequential number is a number that is updated every time the master node makes a decision to change the communication parameters, as an example the sequential number may be increased or randomly changed every time the master makes a decision to change the communication parameters. All data packets 30 transmitted in the wireless network contains the latest known sequential number for the node that transmits the data packet. If a sub-node detects an updated sequential number in the number field 31, then a process to update the communication parameters is initiated, as described in more detail in connection with FIGS. 6-8.

Figure 4:
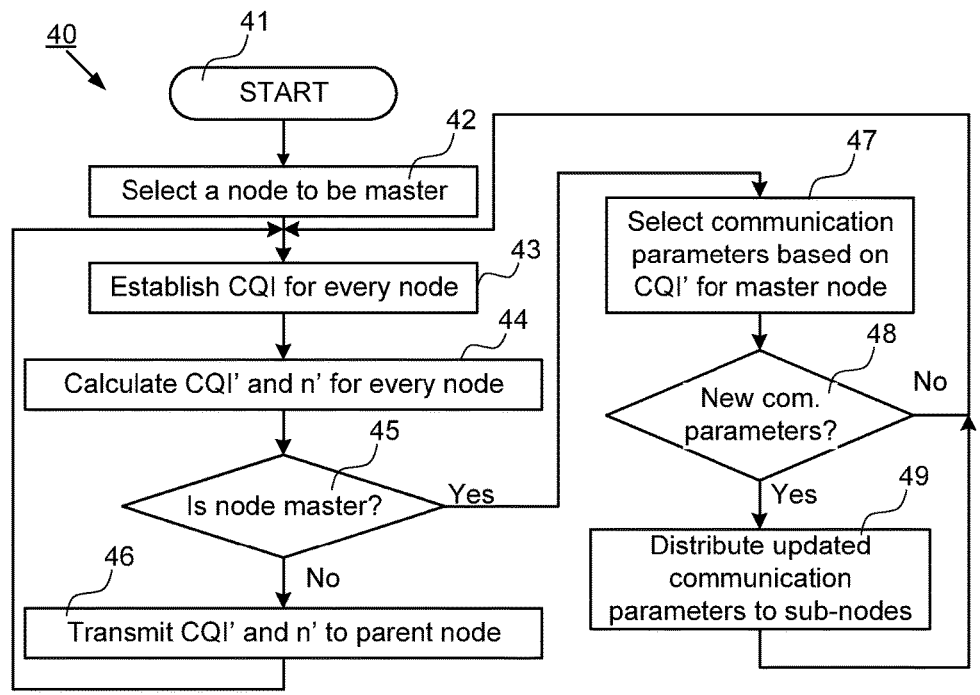
FIG. 4 shows a flow chart for collecting and selecting communication parameters in a wireless network.

FIG. 4 shows a flow chart 40 for collecting and selecting communication parameters in a wireless network.

The flow starts at 41 and in 42 the nodes in the wireless network are divided into one master node and sub-nodes arranged in a tree structure. Any node in the network has the required memory capacity and processing capabilities to be master node, since the same calculations are performed in all nodes within the network. Each sub-node has a parent node and may have one or more child nodes according to the tree structure previously described.

The channel quality index CQI is established for each node (both for sub-nodes and master node) as indicated by 43. In 44 a modified channel quality index CQI' is calculated for each node according to equation (2) or (3) and if CQI' is calculated according to equation (3), then a modified index value n' has to be calculated.

The procedure for collecting information regarding the wireless environment differs between master node and sub-node, and in 45 the process is decided to proceed to 46 if the node is a sub-node, and if the node is the master node the process proceeds to 47. In 46, the modified channel quality index CQI' (and optionally the index value n') is transmitted to the parent node at predetermined intervals, and then the flow is fed back to 43 to continue monitoring the wireless environment.

A decision regarding the communication parameters is made in 47 based on the calculated modified channel quality index CQI' in the master node. If the master node decides not to update the communication parameters in 48, i.e. keep the sequential number when transmitting data packets, then the flow continues to 43 to continue monitoring the wireless environment.

On the other hand, if the master node decides to update the communication parameters in 48, the sequential number used when sending data packets will be updated in 49 and the process to select and communicate (i.e. distribute) updated communication parameters to sub-nodes will start (as described in more detail below). The flow is thereafter fed back to 43 to continue monitoring the wireless environment.

Figure 5:
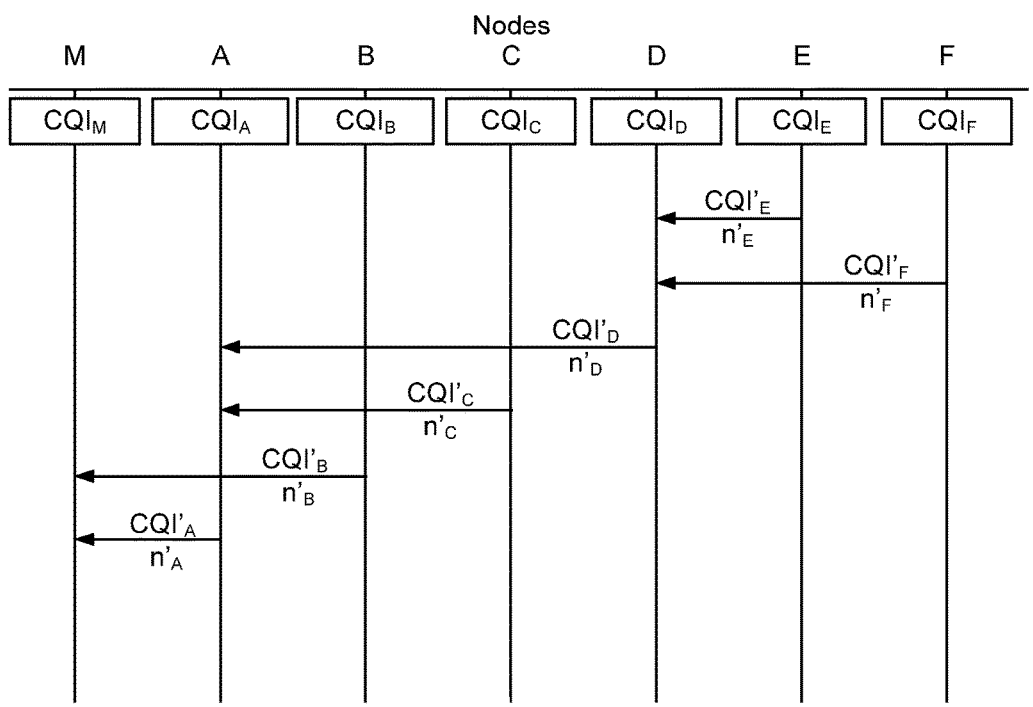
FIG. 5 illustrates an embodiment of a procedure for collecting communication parameters in a wireless network.

FIG. 5 illustrates an embodiment of a procedure for collecting communication parameters in a wireless network. The nodes in this example are arranged in a tree structure as described in connection with FIG. 2. In each node, the channel quality index CQI is monitored and a modified channel quality index CQI' for each node is calculated (optionally together with a modified index value n' if equation (3) is used to calculate the modified channel quality index).

Assume that the wireless environment is the same as described in table 1, then the calculated channel quality index for the master node $CQI'_M$ will be (2;1;0;0) when equation (2) is used and (4;1;0;0) when equation (3) is used, as presented in table 2.

As illustrated in FIG. 5, modified channel quality index $CQI'_{node}$ is calculated in each node, and equation (2) may be modified by substituting $CQI_{acc}$ with equation (5).

The calculations in each node will be:

$$CQI'_{node} = \Sigma CQI_{child\ node} + CQI_{node} \quad (6)$$

TABLE 2

| Node | CQI | CQI' (2) | n' | CQI (3) |
|---|---|---|---|---|
| A | (0; 0; 0; 0) | (1; 1; 0; 0) | 5 | (3; 1; 0; 0) |
| B | (1; 0; 0; 0) | (1; 0; 0; 0) | 1 | (1; 0; 0; 0) |
| C | (0; 1; 0; 0) | (0; 1; 0; 0) | 1 | (0; 1; 0; 0) |
| D | (1; 0; 0; 0) | (1; 0; 0; 0) | 3 | (3; 0; 0; 0) |
| E | (0; 0; 0; 0) | (0; 0; 0; 0) | 1 | (0; 0; 0; 0) |
| F | (0; 0; 0; 0) | (0; 0; 0; 0) | 1 | (0; 0; 0; 0) |
| M | (0; 0; 0; 0) | (2; 1; 0; 0) | 7 | (4; 1; 0; 0) |

The modified channel quality index is presented in table 2, column 3, for each node in this example:
$CQI'_F = CQI_F$, since no child nodes to sub-node F
$CQI'_E = CQI_E$, since no child nodes to sub-node E
$CQI'_D = CQI'_F + CQI'_E + CQI_D$
$CQI'_C = CQI_C$, since no child nodes to sub-node C
$CQI'_B = CQI_D$, since no child nodes to sub-node B
$CQI'_A = CQI'_C + CQI'_D + CQI_A$
$CQI'_M = CQI'_A + CQI'_B + CQI_M$ It is interesting to note that the result from the calculation when using equation (2) is the same as for the prior art solution described in connection with FIG. 1, but without having to use a dedicated master node to collect all the monitored channel quality indexes from the sub-nodes and perform the calculation task in the master node.

Similarly, equation (3) may be modified by substituting $CQI_{acc}$ with equation (5) and substituting (n+1) with equation (4b). The calculations in each node will be:

$$CQI'_{node} = \Sigma CQI'_{child\ node} + n'_{node} \cdot CQI_{node} \qquad (7)$$

and information regarding the number of sub-nodes that has contributed to the accumulated quality index, i.e. the modified index value n', also have to be calculated and transmitted to the parent node according to equation (4a) and (4b) and can be expressed as:

$$n'_{node} = \Sigma n'_{child\ node} + 1 \qquad (8)$$

The modified index value is presented in table 2, column 4 and the modified channel quality index is presented in table 2, column 5, for each node in this example:
$CQI'_F = CQI_F$ and $n'_F = 1$, since no child nodes to sub-node F
$CQI'_E = CQI_E$ and $n'_E = 1$, since no child nodes to sub-node E
$CQI'_D = CQI'_F + CQI'_E + n'_D \cdot CQI_D$ and $n'_D = n'_F + n'_E + 1$
$CQI'_E = CQI_E$ and $n'_C = 1$, since no child nodes to sub-node C
$CQI'_B = CQI_B$ and $n'_B = 1$, since no child nodes to sub-node B
$CQI'_A\ CQI'_C + CQI'_D + n'_A \cdot CQI_A$ and $n'_A\ n'_E + n'_D + 1$
$CQI'_M = CQI'_A + CQI'_B + n'_M \cdot CQI_M$ and $n'_M = n'_A + n'_B + 1$ Furthermore, a more clear indication of the possibility to use the available frequency channels is apparent when applying equation (3) instead. The bad frequency channel f1 will also affect the possibility to communicate with sub-nodes E and F although they do not experience any problems to use this frequency channel themselves. A more robust and reliable selection of communication parameters is thus achieved.

Figure 6:
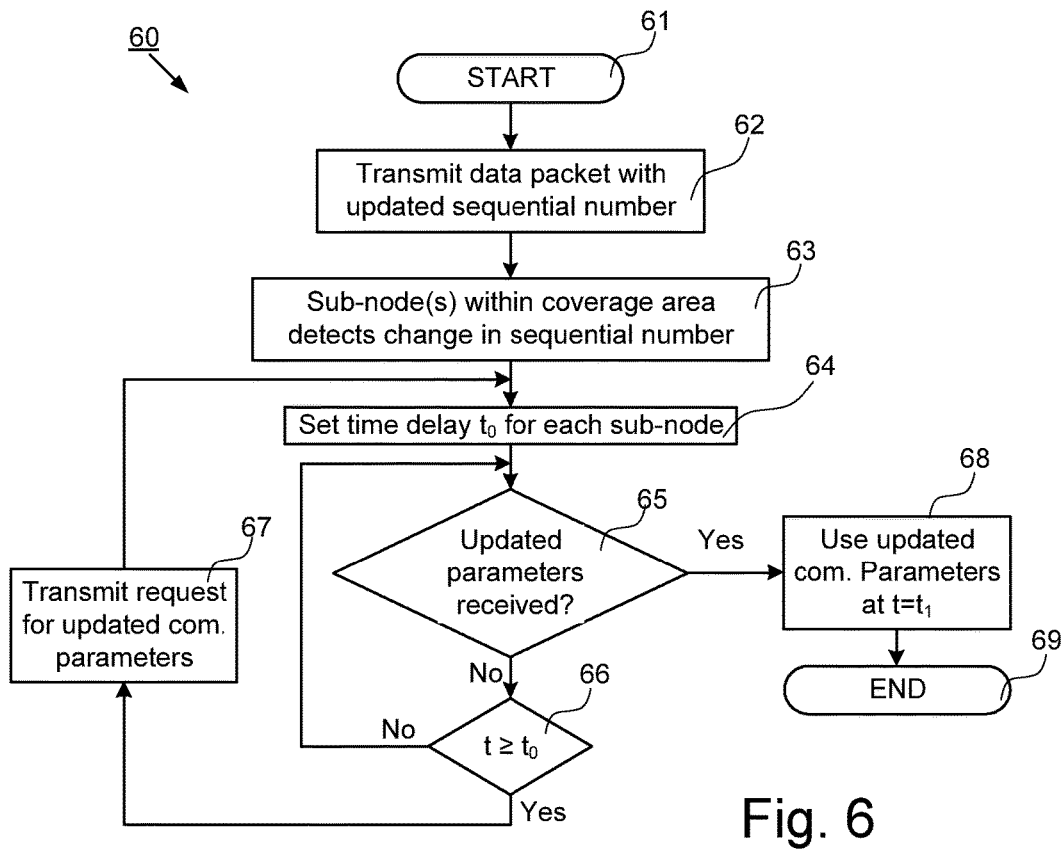
FIG. 6 shows a flow chart for distributing selected communication parameters in a wireless network.

FIG. 6 shows a flow chart 60 for distributing selected communication parameters in a wireless network. Each node is configured to use the latest known sequential number when sending data packets in the wireless network. The flow chart 60 is applicable to all nodes, but the process of updating the communication parameters is initiated by the master node. When the master node has decided to update the communication parameters, the master node updates the sequential number and the flow starts in 61.

Data packets are used for data communication within the wireless network and each data packet comprises a sequential number identifying selected communication parameters, as previously described and in 62 the master node communicate updated communication parameters to at least one sub-node in the wireless network by transmitting a data packet comprising an updated sequential number.

Sub-nodes within the coverage area of the master node detect the updated sequential number in the data packet in 63 and starts listening for communication parameters associated with said updated sequential number.

In order to minimize data transmission and improve reliability within the network, a time delay "to" may be applied for each sub-node in 64 and during the time delay each sub-node that has detected the updated sequential number listens for communication parameters associated with said updated sequential number. The time delay "to" may be hardcoded in each sub-node, e.g. a predetermined number of seconds, a random time-delay generated by each sub-node, e.g. between two and five seconds, or a time-delay included in the data packet transmitted from the master node.

In 65, each sub-node that has detected the updated sequential number checks if new communication parameters has been received. If not, the flow continues to 66, wherein the elapsed time "t" since the sub-node detected the updated sequential number is compared with the time-delay "to". If the time elapsed is less than the time-delay, the flow is fed back to 65.

However, if the elapsed time is equal or larger than the time-delay, the flow continues to 67, and a request for updated communication parameters is transmitted from the sub-node. The flow is thereafter fed back to 64 and a new time-delay is set.

If the sub-node that has detected an updated sequential number also has received updated communication parameters, the flow continues from 65 to 68, where the updated communication parameters will be used at a predetermined time "$t_1$".

Updated parameters have to be distributed to all sub-nodes in the wireless network to ensure functionality. This can be achieved by the master node transmitting a point in time from when the updated parameters should be used, or each sub-node decides the point of time from where the updated communication parameters should be used based upon a fixed time, e.g. twenty three seconds, from where it detected the updated sequential number.

The flow ends in 69 when all sub-nodes have detected the updated sequential number and received updated communication parameters. This process will be described in more detail in connection with FIGS. 7 and 8.

Figure 7:
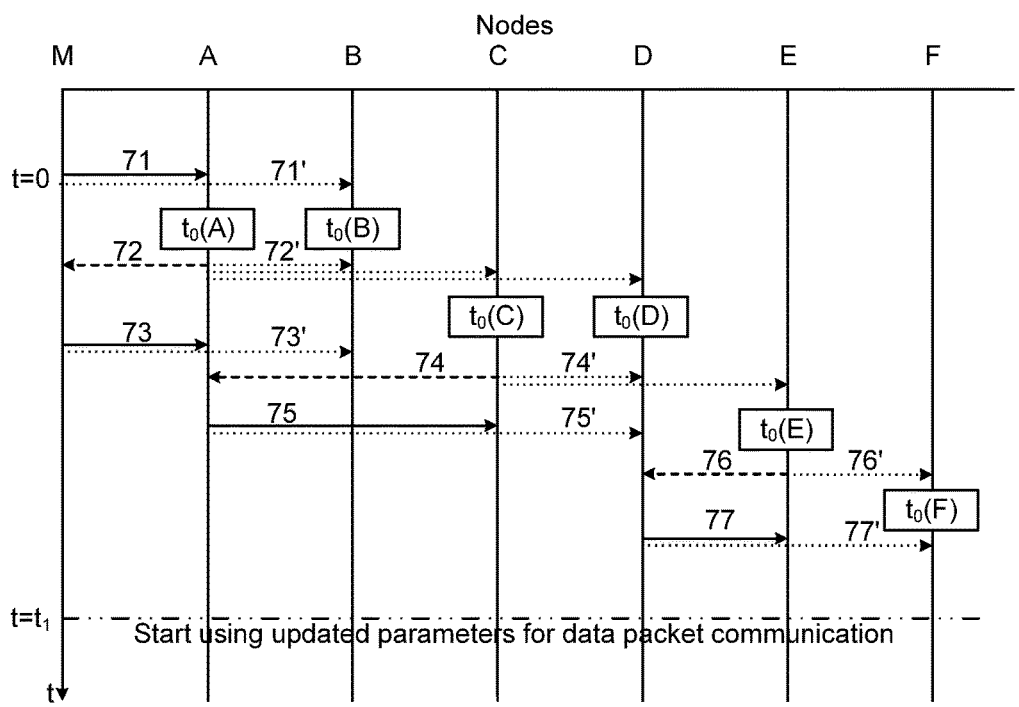
FIG. 7 illustrates a first embodiment of a procedure for distributing communication parameters in a wireless network.

FIG. 7 illustrates a first embodiment of a procedure for distributing communication parameters in a wireless network. Solid arrows in FIG. 7 indicate data packet communication between two nodes with updated sequential number.

At t=0, the master node M transmits a data packet 71 with updated sequential number to sub-node A. This message is also heard by sub-node B, as indicated by the dotted arrow 71', since it is within the coverage area of the master node M. A time-delay to is initiated in sub-nodes A and B during which time they listen to further communications that include the updated communication parameters.

In this example, the elapsed time is larger than the time-delay for sub-node A and a request for updated communication parameters is transmitted from sub-node A to the master node M (as indicated by dashed arrow 72), which is heard by sub-nodes B, C and D as indicated by dotted arrows 72'. A time-delay is initiated in sub-nodes C and D and they listen to receive updated communication parameters.

A data packet 73 with updated communication parameters is transmitted from master node M to sub-node A, which is heard by sub-node B, as indicated by dotted arrow 73'. Since sub-node B has received the updated communication parameters without having to transmit a request, sub-node A and sub-node B wait until $t=t_1$ to start using them. However, both sub-node A and B can provide information to any other sub-node requesting updated communication parameters.

Next, in this example the elapsed time is larger than the time-delay for sub-node C and a request is transmitted to the parent node sub-node A (as indicated by dotted arrow 74), which is also heard by sub-nodes D and E, as indicated by dotted arrows 74'. The time-delay for sub-node E is initiated.

A data packet 75 with updated communication parameters is transmitted from sub-node A to sub-node C, which is heard by sub-node D as indicated by dotted arrow 75'. Since sub-node D has received the updated communication parameters without having to transmit a request, sub-node C and sub-node D wait until $t=t_1$ to start using them. However, both sub-node C and D can provide information to any other sub-node requesting updated communication parameters.

Next, the elapsed time is larger than the time-delay for sub-node E and a request is transmitted to sub-node D (as indicated by dashed arrow 76, which is heard by sub-node F, as indicated by dotted arrow 76'. The time-delay for sub-node F is initiated.

A data packet 77 with updated communication parameters is transmitted from sub-node D to sub-node E, which is heard by sub-node F as indicated by dotted arrow 77'. Since sub-node F has received the updated communication parameters without having to transmit a request, sub-node E and sub-node F wait until t=t$_1$ to start using them. All sub-nodes have received the updated communication parameter and the process is complete when the nodes in the wireless network start to use the updated communication parameters.

Please note that the time-delay t$_0$ may be different for each sub-node and that the coverage area for each node may differ from each other.

Figure 8:
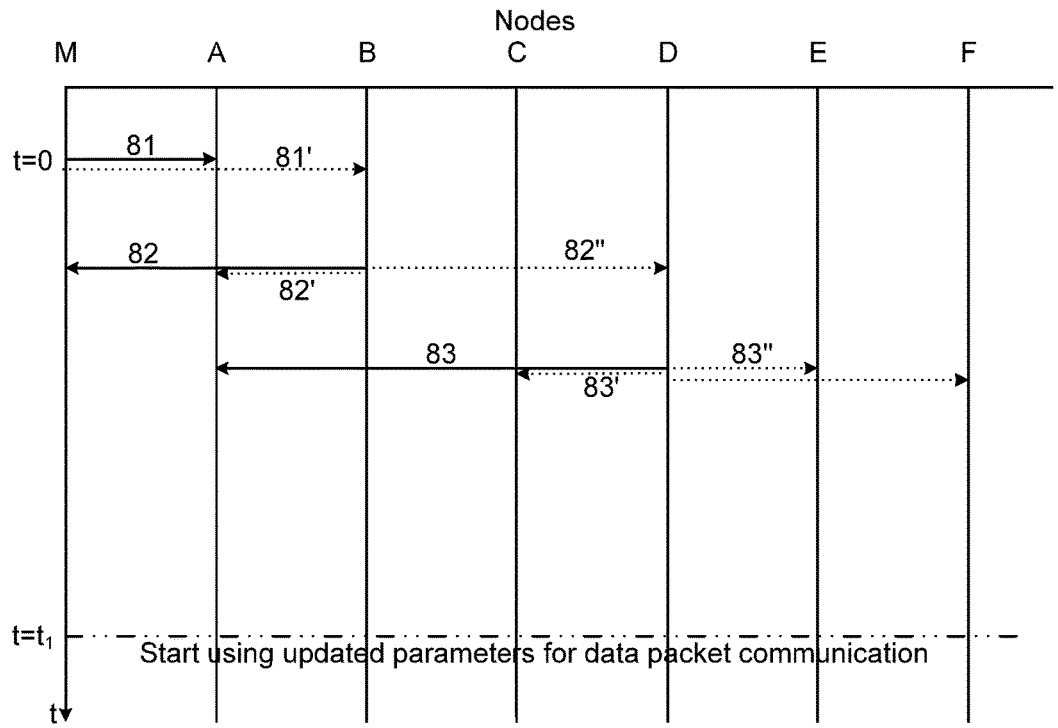
FIG. 8 illustrates a second embodiment of a procedure for distributing communication parameters in a wireless network.

FIG. 8 illustrates a second embodiment of a procedure for distributing communication parameters in a wireless network. Solid arrows in FIG. 8 indicate data packet communication between two nodes with updated sequential number and updated communication parameters associated with the updated sequential number.

At t=0, the master node M transmits a data packet 81 with updated sequential number and updated communication parameters to sub-node A. This message is also heard by sub-node B, as indicated by the dotted arrow 81', since it is within the coverage area of the master node M.

Next, in this example, sub-node B transmits a data packet 82 with updated sequential number and updated communication parameters to master node M. This message is also heard by sub-node A, as indicated by the dotted arrow 82', and sub-node D, as indicated by dotted arrow 82", since they are within the coverage area of the sub-node B.

Next, in this example, sub-node D transmits a data packet 83 with updated sequential number and updated communication parameters to sub-node A. This message is also heard by sub-node C, as indicated by the dotted arrow 83', and sub-nodes E and F, as indicated by dotted arrow 83", since they are within the coverage area of the sub-node D.

In this example all sub-nodes are reached with the transmission of only three data packets. The updated communication parameters are ready to be used at t=t$_1$.

When the updated sequential number and updated communication parameters are transmitted at the same time, it is not necessary to allocate a time-delay to each sub-node that has detected the updated sequential number, and no request for updated communication numbers are needed. Therefore, the flow chart in FIG. 6 may be modified by eliminating steps 64-67, and the flow proceeds directly from step 63 to step 68 since step 63 already includes listening for updated communication parameters.

Figure 9:
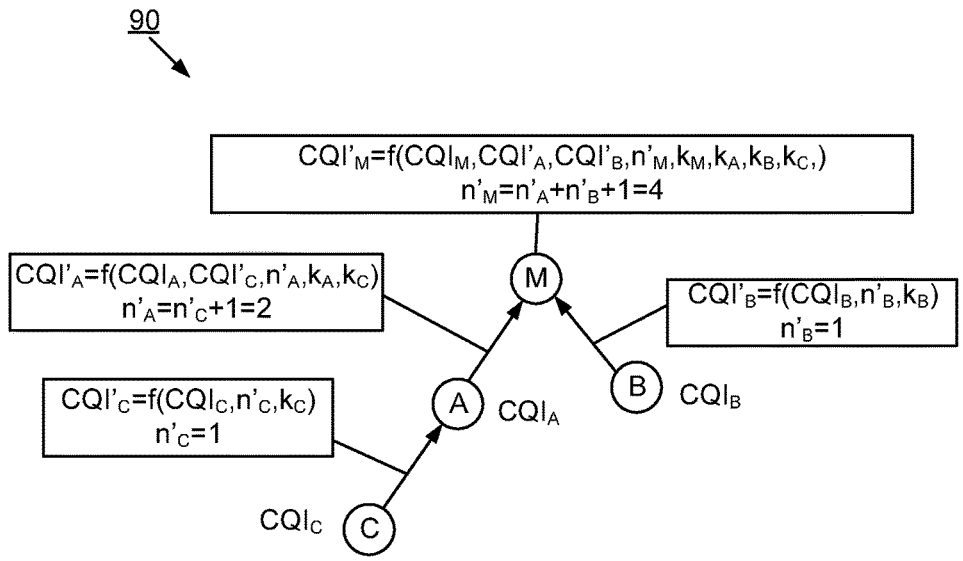
FIG. 9 illustrates a second embodiment of a procedure for collecting and selecting communication parameters in a wireless network.

FIG. 9 illustrates a second embodiment 90 of a procedure for collecting and selecting communication parameters in a wireless network.

In some wireless networks there might be certain nodes that are more important to maintain good communication with and in this embodiment an additional weight is introduced called priority value "k".

The quality indication value for each communication channel is multiplied with a modified priority value (k') to calculate a weighted quality indication value. The modified priority value is the maximum priority value from the group: priority value of the node; modified priority value of the child node(s), if any. Each sub-node is also configured to transmit the modified priority value to the parent node.

Equation (2) may be modified as follows:

$$CQI'_{node}=CQI_{acc}+k'_{node} \cdot CQI_{node} \quad (9)$$

where $k'_{node}=\max[k_{acc};k_{node}]$ (10)

k'$_{node}$ corresponds to the maximum priority value of the sub-nodes that have contributed to the accumulated channel quality index and the priority value of the node.

Similar modification can be made to equation (3) in combination with equation (4b):

$$CQI'_{node}=CQI_{acc}+k'_{node} \cdot n'_{node} \cdot CQI_{node} \quad (11)$$

In FIG. 9, the modified channel quality index of sub-node C can be expressed as:

$$CQI'_C=f(CQI_C,n'_C,k_C)=k_C \cdot n'_C \cdot CQI_C, \text{ where } n'_C=1 \text{ (no child nodes)}$$

The same applies for sub-node B:

$$CQI'_B=f(CQI_B,n'_B,k_B)=k_B \cdot n'_B \cdot CQI_B, \text{ where } n'_B=1 \text{ (no child nodes)}$$

For sub-node A, the expression is:

$$CQI'_A=f(CQI_A,CQI_C,n'_A,k_A,k_C)=CQI'_C+\max[k_A;k_C] \cdot n'_A \cdot CQI_A, \text{ where } n'_A=2$$

For master node M, the expression is:

$$CQI'_M=f(CQI_M,CQI'_A,CQI'_B,n'_M,k_M,k_A,k_B,k_C)$$
$$=>CQI'_M=CQI'_A+CQI'_B+\max[k_M;k_A;k_B;k_C] \cdot n'_M \cdot CQI_A, \text{ where } n'_M=4$$

To illustrate the advantage with the use of priority values, the following priority values are selected for illustration purposes using equation (11) in comparison with equation (3):

$k_M=1$ $k_A=1$ $k_B=1.5$ $k_C=2$

Sub-node C is a prioritized communication point in the wireless network, although sub-node B is higher prioritized than sub-node A, the result of how to select communication parameters is as follows:

TABLE 3

| Node | CQI | k | k' | n' | CQI' [Eq(11)] | CQI' [Eq(3)] |
|---|---|---|---|---|---|---|
| A | (0; 0; 0; 1) | 1 | 2 | 2 | (0; 0; 0; 4) | (0; 0; 0; 2) |
| B | (1; 0; 0; 0) | 1.5 | 1.5 | 1 | (1.5; 0; 0; 0) | (1; 0; 0; 0) |
| C | (0; 0; 0; 0) | 2 | 2 | 1 | (0; 0; 0; 0) | (0; 0; 0; 0) |
| M | (0; 0; 0; 0) | 1 | 2 | 4 | (1.5; 0; 0; 4) | (1; 0; 0; 2) |

In order to decide communication parameters in the wireless network, a threshold of "2" is selected for illustration purposes. If the quality indication value is above "2", the communication parameter is de-selected or at least the usage of the communication parameter is limited.

The calculations in the master node M using equation (11) results in detection of poor communication performance for communication channel f4 (over the selected threshold) and by avoiding using (or at least limit the usage of) frequency channel f4, the communication with sub-node C is prioritized. However, if priority values are not used and the decision process in the master node use equation (3), no quality indication value is above the threshold and therefore all communication parameters are used. This may be a problem if sub-node A has problems communicating over frequency channel f4.

The method described above may be implemented in a system for selecting communication parameters in a wireless network comprising a plurality of nodes configured to wirelessly communicate with each other over a plurality of communication channels. As previously mentioned, the plurality of nodes are divided into one master node and at least one sub-node, and the wireless network is arranged in a tree structure whereby each sub-node has a parent node and each node may have one or more child nodes.

Each node in the system is configured to establish a channel quality index comprising a quality indication value for each of the communication channels, and calculate a modified channel quality index based on:
the channel quality index established in the node, and
an accumulated channel quality index based on the channel quality index established in the child node(s), if any.

Furthermore, each sub-node in the system is configured to transmit the modified channel quality index to the parent node, and the master node is configured to select and communicate updated communication parameters to each sub-node based on the modified channel quality index calculated in the master node.

The system may be configured to select the quality indication value to be a discrete value indicating good channel or bad channel for communication purposes.

The calculated accumulated channel quality index may be based on the modified channel quality index transmitted from the one or more child nodes, if any. In addition, the accumulated channels quality index may comprise summing, for each communication channel, the quality indication value of the modified quality index transmitted from the child node(s), if any.

Furthermore, the system may be configured to sum, for each communication channel, the quality indication value of the channel quality index established by the node, and the quality indication value of the accumulated channel quality index to create the modified channel quality index.

Each node may be configured to calculate a weighted quality indication value for each communication channel, and to sum the weighted quality indication value and the quality indication value of the accumulated channel quality index, for each communication channel, to create the modified channel quality index.

Furthermore, each node may be configured to calculate an index value n corresponding to the number of nodes that have contributed to the accumulated channel quality index, and to multiply the quality indication value for each communication channel with a modified index value n' equal to the index value plus one (n+1) in order to calculate the weighted quality indication value. Each sub-node may also be configured to transmit the modified index value to the parent node.

In addition, each node may be configured to multiply the quality indication value for each communication channel with a modified priority value k' to calculate the weighted quality indication value. The modified priority value is the maximum priority value from the group: priority value of the node; modified priority value of the child node(s), if any. Each sub-node may be configured to transmit the modified priority value to the parent node.

The wireless network may be configured to be a frequency hopping network with a frequency hopping scheme and the plurality of communication channels may comprise a predetermined number of frequency channels. The selection of updated communication parameters may further comprise:
selecting a limited number of frequency channels, and/or updating the frequency hopping scheme.

The master node may be configured to select frequency channels having a channel indication value in the modified channel quality index being better than a threshold value, wherein the threshold value is selected to provide a minimum number of frequency channels. Alternatively, a utilization percentage of each frequency channel may be selected.

Data packets are used for data communication within the wireless network and each data packet comprises a sequential number identifying selected communication parameters, as described in connection with FIG. 3.

The system may further be configured to:
transmit, from a node, a data packet comprising an updated sequential number,
detect, in sub-nodes within the coverage area of the transmitting node, the updated sequential number in the data packet,
listen, in each sub-node that has detected an updated sequential number, for communication parameters associated with the updated sequential number, and
use the updated communication parameters at a predetermined time.

The system may also be configured to:
set a time-delay for each sub-node that has detected the updated sequential number, and
transmit a request from a sub-node if the communication parameters associated with the updated sequential number has not been received during the time-delay.

The data packet communicated from the node may comprise the updated communication parameters associated with the updated sequential number, and the transmitting node may be the master node, or a sub-node that previously has detected an updated sequential number.

As previously mentioned, in one embodiment of the wireless network it is configured as a frequency hopping network with a frequency hopping scheme and said plurality of communication channels with a predetermined number of frequency channels. The selection of updated communication parameters may comprise:
selecting a limited number of frequency channels, and/or updating the frequency hopping scheme.

The selected frequency channels have a channel indication value in the modified channel quality index of the master node being better than a threshold value. The threshold value is selected to provide a minimum number of frequency channels.

According to national regulations, there may be requirements to use all frequency channels and then the selecting process may comprise selecting the utilization percentage of each frequency channel.

When monitoring the channel quality index CQI, the term "CQI" should not be limited to relate to the quality of a physical channel but could also be related to monitoring different parameters that have an impact on the communication channel.

The invention claimed is:

1. A method for selecting communication parameters in a wireless network including a plurality of nodes configured to wirelessly communicate with each other over a plurality of communication channels, the method comprising:
a) establishing a channel quality index for each node in the wireless network, the channel quality index including a quality indication value for each of the communication channels;
b) dividing the plurality of nodes into one master node and at least one sub-node, the master node being configured to select communication parameters in the wireless network, and to communicate the communication parameters to the at least one sub-node in the wireless network;

c) configuring the wireless network in a tree structure, such that each sub-node has a parent node and each node may have one or more child nodes;

d) for each node, calculating a modified channel quality index based on
   the channel quality index established in the node, and
   an accumulated channel quality index based on the modified channel quality index established in and transmitted from its child nodes;

d1) for each node, calculating a weighted quality indication value for each communication channel;

d2) for each communication channel, summing the weighted quality indication value, and the quality indication value of the accumulated channel quality index to create the modified channel quality index;

e) for each sub-node, transmitting the modified channel quality index to its parent node; and f) selecting and communicating updated communication parameters based on the modified channel quality index calculated in the master node.

2. The method according to claim 1, further comprising:
selecting the quality indication value in step a) to be a discrete value indicating good channel or bad channel for communication purposes.

3. The method according to claim 1, wherein the accumulated channel quality index comprises summing, for each communication channel, the quality indication value of the modified quality index transmitted from the child nodes.

4. The method according to claim 1, wherein step d1) further comprises:
in the node, calculating an index value n corresponding to the number of nodes that have contributed to the accumulated channel quality index;
multiplying the quality indication value for each communication channel with a modified index value n' equal to the index value plus one n+1 to calculate the weighted quality indication value; and
for each sub-node, transmitting the modified index value to its parent node.

5. The method according to any of claim 1, wherein step d1) further comprises:
multiplying the quality indication value for each communication channel with a modified priority value k' to calculate the weighted quality indication value, the modified priority value is the maximum priority value from the group consisting of the priority value of the node and the modified priority value of the child nodes, if any; and
for each sub-node, transmitting the modified priority value to its parent node.

6. The method according to claim 1, wherein the wireless network is configured to be a frequency hopping network with a frequency hopping scheme;
and wherein the plurality of communication channels includes a predetermined number of frequency channels; and
wherein selecting updated communication parameters in step f) further comprises:
f1) selecting a limited number of frequency channels; and/or
f2) updating the frequency hopping scheme.

7. The method according to claim 6, wherein step f1) further comprises selecting frequency channels having a channel indication value in the modified channel quality index being better than a threshold value; and
wherein the threshold value is selected to provide a minimum number of frequency channels.

8. The method according to claim 6, wherein step f2) further comprises selecting a utilization percentage of each frequency channel.

9. The method according to claim 1, wherein data packets are used for data communication within the wireless network and each data packet includes a sequential number identifying selected communication parameters; and
wherein the method further comprises:
transmitting, from a node, a data packet including an updated sequential number;
detecting, in sub-nodes within the coverage area of the transmitting node, the updated sequential number in the data packet;
listening, in each sub-node that has detected an updated sequential number, for communication parameters associated with the updated sequential number; and
using the updated communication parameters at a predetermined time.

10. The method according to claim 9, wherein the method further comprises:
setting a time-delay for each sub-node that has detected the updated sequential number; and
transmitting a request from a sub-node if the communication parameters associated with the updated sequential number has not been received during the time-delay.

11. The method according to claim 9, wherein the data packet communicated from the node further includes the updated communication parameters associated with the updated sequential number.

12. The method according to claim 9, wherein the transmitting node is the master node, or a sub-node that previously has detected an updated sequential number.

13. A system for selecting communication parameters in a wireless network comprising:
a plurality of nodes configured to wirelessly communicate with each other over a plurality of communication channels, the plurality of nodes being divided into one master node and at least one sub-node, the wireless network being arranged in a tree structure such that each sub-node has a parent node and each node may have one or more child nodes;
wherein each node in the system is configured to:
   establish a channel quality index, the channel quality index including a quality indication value for each of the communication channels,
   calculate a modified channel quality index based on
   the channel quality index established in the node, and
   an accumulated channel quality index based on the modified channel quality index established in its child nodes, and
   calculate a weighted quality indication value for each communication channel, and for each communication channel, sum the weighted quality indication value, and the quality indication of the accumulated channel quality index to create the modified channel quality index;
wherein each sub-node in the system is configured to transmit the modified channel quality index to its parent node; and
wherein the master node is configured to select and communicate updated communication parameters to each sub-node based on the modified channel quality index calculated in the master node.

14. The system according to claim 13, wherein each node in the system is configured to:
   calculate an index value n corresponding to the number of nodes that have contributed to the accumulated channel quality index, and
   multiply the quality indication value for each communication channel with a modified index value n' equal to the index value plus one n+1 to calculate the weighted quality indication value; and
   wherein each sub-node in the system is configured to transmit the modified index value to its parent node.

15. A system for selecting communication parameters in a wireless network comprising:
   a plurality of nodes configured to wirelessly communicate with each other over a plurality of communication channels, the plurality of nodes being divided into one master node and at least one sub-node, the wireless network being arranged in a tree structure such that each sub-node has a parent node and each node may have one or more child nodes;
   wherein each node in the system is configured to:
      establish a channel quality index, the channel quality index including a quality indication value for each of the communication channels,
      calculate a modified channel quality index based on the channel quality index established in the node, and
      an accumulated channel quality index based on the modified channel quality index established in its child nodes, and
      calculate a weighted quality indication value for each communication channel, and for each communication channel, sum the weighted quality indication value, and the quality indication of the accumulated channel quality index to create the modified channel quality index;
   wherein each sub-node in the system is configured to transmit the modified channel quality index to its parent node;
   wherein the master node is configured to select and communicate updated communication parameters to each sub-node based on the modified channel quality index calculated in the master node;
   wherein each node in the system is configured to multiply the quality indication value for each communication channel with a modified priority value k' to calculate the weighted quality indication value, the modified priority value is the maximum priority value from the group consisting of the priority value of the node and the modified priority value of the child nodes; and
   wherein each sub-node in the system is configured to transmit the modified priority value to its parent node.

* * * * *